July 6, 1937.  G. L. USSELMAN  2,085,838
VARIABLE CONDENSER
Original Filed March 19, 1927    2 Sheets-Sheet 1
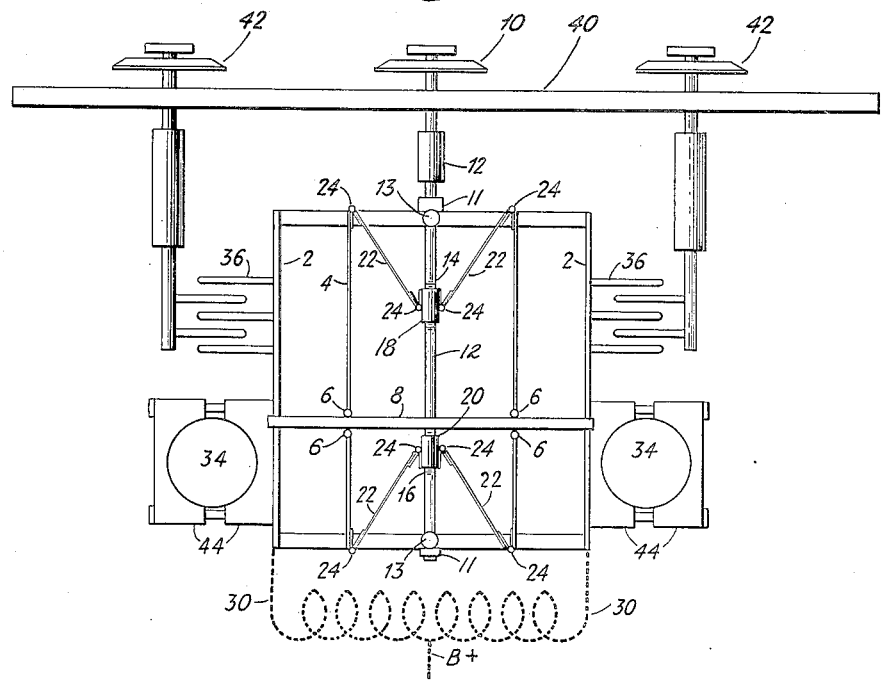
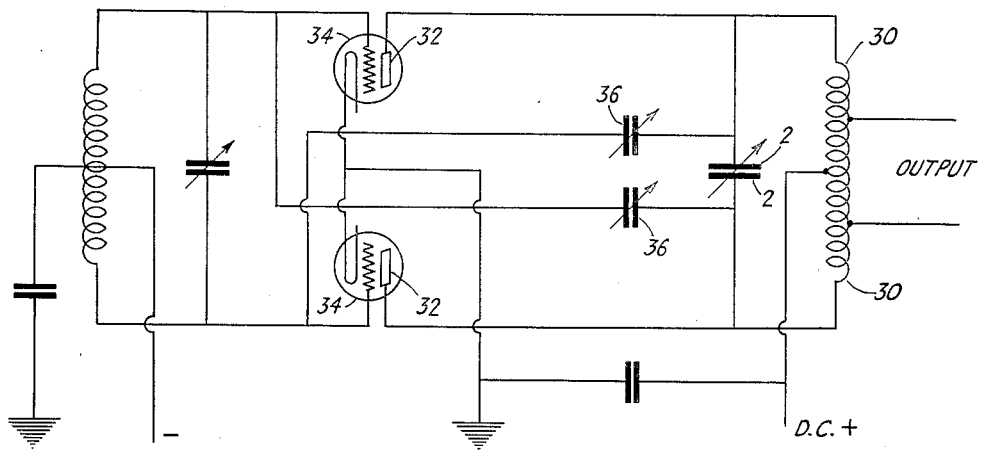
INVENTOR
GEORGE L. USSELMAN
BY *H. G. Grover*
ATTORNEY

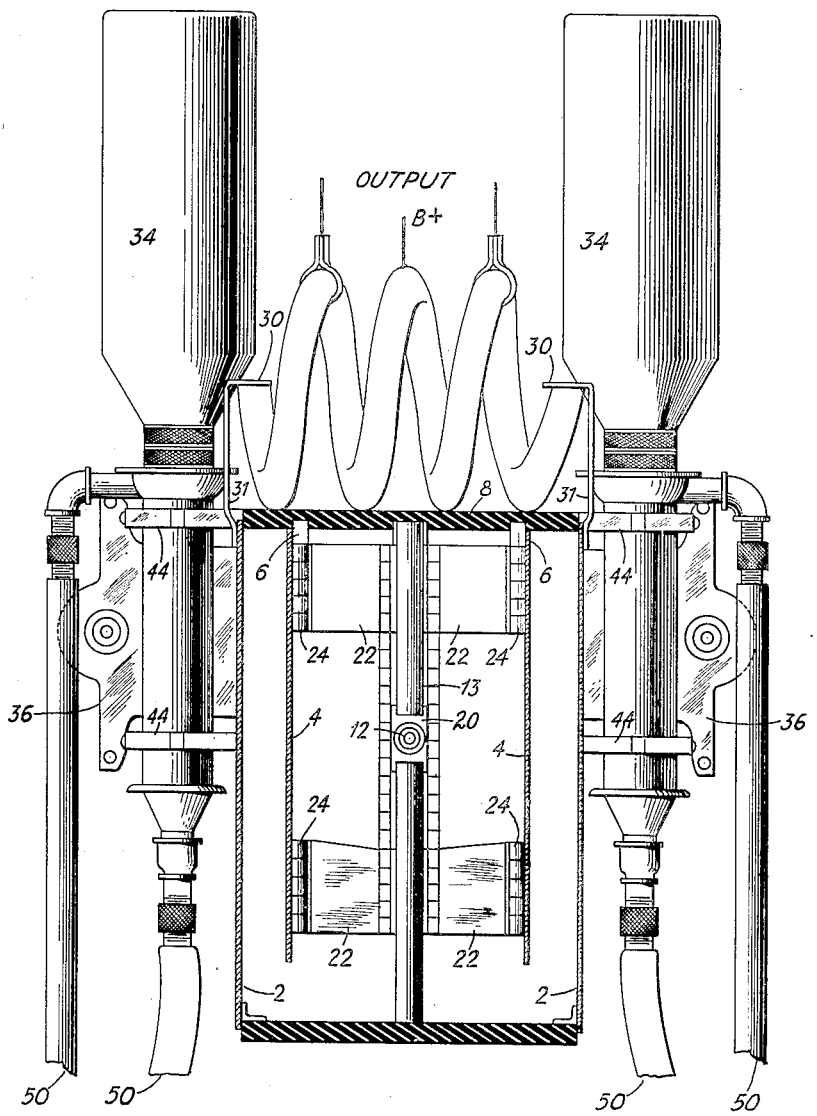

Patented July 6, 1937

2,085,838

UNITED STATES PATENT OFFICE 2,085,838

VARIABLE CONDENSER

George L. Usselman, Port Jefferson, N. Y., assignor to Radio Corporation of America, a corporation of Delaware Original application March 19, 1927, Serial No. 176,605. Patent No. 1,876,106. Divided and this application May 27, 1932, Serial No. 613,317. In Great Britain May 19, 1927

2 Claims. (Cl. 175—41.5)

This application is a division of my copending application entitled "Power stage arrangement", now issued as Patent No. 1,876,106, and is especially directed towards the condenser arrangement shown therein.

An object of my present invention is to provide a tuning condenser which is capable of withstanding the extremely high radio frequency potentials impressed upon it, and which at the same time is capable of being finely adjusted to accurately control the frequency to which its circuit is tuned. At high frequencies the capacitance need not be very great, and, in fact, I find it convenient to employ two variable condensers in series, and to adjust their capacitances by altering the distance between a movable plate and a fixed plate. More particularly, I prefer to use two fixed plates spaced a substantial distance apart and two movable plates situated between the fixed plates and arranged to be moved simultaneously nearer to or further from the fixed plates. The movable plates being electrically as well as mechanically connected together it follows that the two variable condensers are connected in series. In this way the two outside fixed plates may be rigidly fixed and then may also serve as a mounting for the electron emission tubes, the inductor of the output circuit, and the neutralizing condensers, all of which are therefore attached to the condenser and to one another with leads which are substantially of zero length.

The specification is accompanied by drawings in which

Figure 1 is a partially schematic plan view of my novel arrangement;

Figure 2 is a wiring diagram; and,

Figure 3 is a rear elevation showing the more important parts of my arrangement.

Referring to Figure 1; 2, 2 are the fixed plates of my novel condenser, and 4, 4 are the movable plates. The latter are guided by the rollers 6 which ride upon an insulation rail 8. The condenser is adjusted by means of the wheel or dial 10 which turns the rod 12. This rod is threaded with a right and left hand thread at 14 and 16, and by means of these threads the sleeve nuts 18 and 20 are moved further away from each other or in an opposite direction when rod 12 is rotated in a clockwise direction. Likewise, when rod 12 is rotated in a counter-clockwise direction, then each of the sleeve nuts 18 and 20 are moved nearer or toward each other. This motion of the sleeve nuts is then transferred to the movable plates, through the medium of the hinges 24, which are joined to the link members 22. Rotation of the wheel 10 results in the movable plates 4, 4 being moved simultaneously and equally in opposite directions, thereby changing the space between plates 2 and 4 and so adjusting the capacitance of the condenser.

Referring now to Figure 2, which is a conventional diagram for a push-pull stage, it is seen that the outer or terminal plates of the condenser 2, 2 are connected to the ends of the tuning inductance 30 and to the anodes 32, 32 of the tubes 34, 34 as well as to one set of the fixed plates of the neutralizing condensers 36, 36.

Referring again to Figure 1 it is seen that since the plates 2, 2 of the condenser are fixed with reference to the switch board panel 40, the neutralizing condensers 36, 36 may conveniently be mounted directly upon them. The control means for the neutralizing condensers are brought through the panel, as shown at 42, 42.

Similarly, the tubes 34, 34 may be mounted directly on the plates 2, 2, through the agency of split clamping members 44. These clamps are in contact directly with the anode jackets and terminals of the tubes 34, so as to make the desired electrical connection.

A coil 30, 30 has been indicated to show how the output inductor will also have leads of negligible length.

Figure 3 is an elevation partly in section, looking towards the rear of the panel. In this figure, as before, the fixed plates 2, 2 capacitively cooperate with the movable plates 4, 4. The guide rollers are shown as 6, 6, and ride upon the insulation rail 8. The link members are shown as 22, and are attached to the movable plates by the hinges 24 which cooperate with the sleeve units 18 and 20 for movement of the plates. The threaded rod 12 is mounted in a bearing 11 supported upon a vertical member 13. The tubes 34 are clamped to the fixed plates 2, 2 by the clamps 44. The tubes are constructed with their anodes at the lower end, water jacketed. These jackets, which are either of metal or of glass with metal fittings, are at anode potential and the clamps 44 make electrical contact between them and the plates 2, 2. The anodes are connected to the metal jackets or fittings, being either integral therewith, or connected thereto through very short electrical connections. Hose inlet and outlet pipes for the cooling liquid are shown at 50.

The output inductor is positioned as shown, and its ends 30, 30 are connected to the condenser plates 2, 2 by means of the short supporting straps 31, 31.

The neutralizing condensers are shown at 36, 36 and, as before explained, these are directly affixed to the terminal plates 2, 2.

The structure herein disclosed is rigid in construction, compact in arrangement, and obtains a minimum length of interconnecting leads for the parts of the output circuit of the stage.

Having thus described my invention, what I claim is:

1. A variable condenser comprising two fixed parallel arranged plates, two movable plates electrically connected together and interposed between said fixed parallel plates, an insulated rail forming a guide for a plurality of rollers mounted on said movable plates for keeping said movable plates in parallel relationship with said fixed parallel plates, a rotatable shaft carrying a plurality of threaded nuts arranged with a plurality of link members secured to said movable plates to move said movable plates simultaneously nearer to or further from said fixed parallel plates.

2. A variable condenser comprising two fixed parallel arranged plates, two movable plates interposed between said fixed parallel plates, an insulated rail adjacent said movable plates, a pair of guide rollers mounted on each of said movable plates for cooperating with said insulated rail for keeping said movable plates in parallel relationship with said fixed plates, a rotatable shaft having right and left hand threads cooperating with similarly threaded nuts arranged with a plurality of link members secured to said movable plates to move said movable plates simultaneously nearer to or further from said fixed parallel plates.

GEORGE L. USSELMAN.